M. H. PAINE.
EXPANSION BOLT.
APPLICATION FILED APR. 29, 1911.

1,031,462.

Patented July 2, 1912.

Witnesses
Martin H. Olsen
Edwin Phelps

Inventor
Mathew H. Paine,
By Rummler & Rummler
Attys.

UNITED STATES PATENT OFFICE.

MATHEW H. PAINE, OF GLENELLYN, ILLINOIS.

EXPANSION-BOLT.

1,031,462.  Specification of Letters Patent.  Patented July 2, 1912.

Application filed April 29, 1911. Serial No. 624,159.

*To all whom it may concern:*

Be it known that I, MATHEW H. PAINE, a citizen of the United States of America, and a resident of Glenellyn, county of DuPage, State of Illinois, have invented certain new and useful Improvements in Expansion-Bolts, of which the following is a specification.

The main objects of this invention are to provide an improved form of expansion bolt; to provide an improved expansion member capable of being placed upon any bolt and expanded through the tightening of the nut; to provide an improved construction for such member whereby, when expanded, it will present a substantially annular and transversely disposed holding shoulder adapted to penetrate the material in which the bolt is sunk and to face outward so as to resist in most efficient manner the pulling out of the bolt; and to provide improved means for expanding such expansion member.

An illustrative embodiment of this invention is shown in the accompanying drawings, in which—

Figure 1:
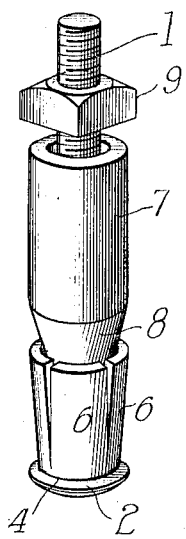
Figure 2:
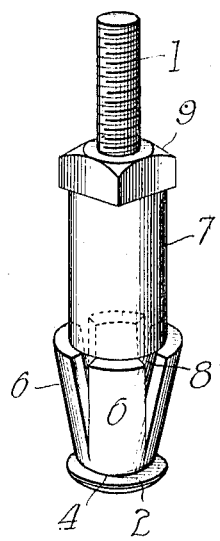
Figure 3:
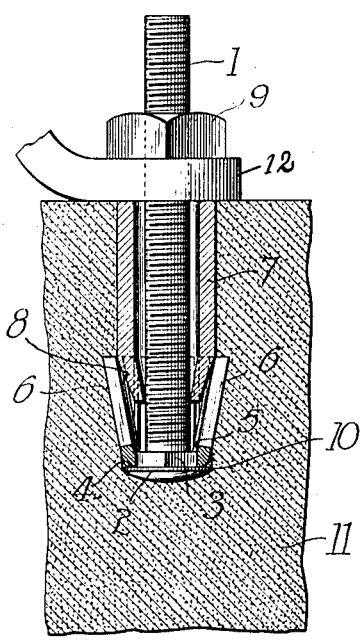
Figure 4:
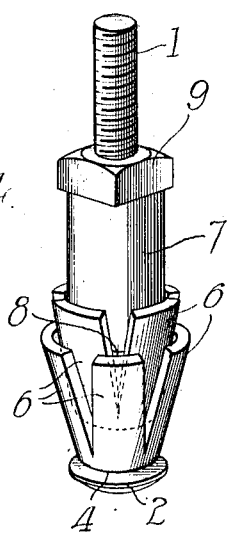
Figure 5:
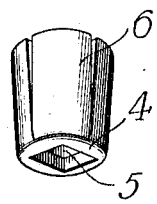

Figure 1 is a perspective view of an expansion bolt constructed according to this invention, the different parts being shown in their relative positions previous to the expanding of the expansion member. Fig. 2 is a similar view showing the relation of the parts after the member has been expanded. Fig. 3 is a sectional detail showing the expansion bolt embedded in a wall. Fig. 4 is a perspective view illustrating the manner in which more than one expansion member may be used on the same bolt. Fig. 5 is a perspective view of the expansion member before having been expanded.

In the form shown in the drawings, the device comprises a bolt having a threaded shank and nut and being fitted with a shell which is adapted to expand transversely when the nut is screwed home on the shank. The threaded shank 1 has a suitable head 2 and is preferably formed with a square part or shoulder at 3. The holding or expansion member is in the form of a cup-shaped shell 4 and is provided in its base with a square aperture 5, which fits over the shoulder 3 and prevents the bolt from turning in the shell.

The sides of the expansion shell 4 are split to form a plurality of lugs or tongues 6 which are initially disposed in a longitudinal direction relative to the bolt, but are slightly flared toward their free ends. A wedge member or sleeve 7 embraces the threaded shank 1 and is tapered at its end 8 so as to enter the adjacent end of the shell 4. A nut 9 engages the sleeve and forces it into the shell 4 for expanding the latter.

When the device is to be used, a hole 10 of suitable size is bored into the body or wall 11, to which the bolt is to be made fast. The bolt 1, with the expansion shell and expanding member in position, is then inserted head foremost into the hole 10. The part 12 to be secured to the body or wall 11 by the bolt is then placed in position so that the bolt protrudes through an aperture in said part 12. The nut 9 is finally placed on the bolt and screwed down firmly. This forces the wedge 7 into the expansion shell 4 and causes the lugs 6 to be forced outward into holding engagement with the sides of the hole 10.

The flaring of the lugs 6 insures the proper entering of the tapered end 8 of the wedge, and also insures that the lugs 6 will engage the material of the body of the wall 11 at their ends first, thus enabling them to be pressed into secure holding engagement with the wall before further expansion is prevented by a large area of contact between the shell and the wall 11. If the hole 10 has been made larger than was necessary, or if additional holding contact is desired, a second expansion member 4 may be placed on the bolt, and the two expanded simultaneously. This will cause the lugs 6 of the innermost shell to be expanded into the material much farther than by the use of the expansion member alone. Then, too, the double set of shoulders more than doubles the holding capacity of the bolt in the wall. When it is desired to withdraw the bolt from the hole, the nut 9 is unscrewed so as to release the sleeve from the expansion shell and after the sleeve is withdrawn, the lugs 6, being resilient, will retract and assume their normal initial position, which will permit the bolt to be removed.

In some places, it may be desirable to expand the shell by other means than the pressure of the nut—for example, a tubular punch set might be used to expand the shell by a blow from a hammer, as will be obvious to those skilled in the art.

Although but one specific embodiment of this invention is herein shown and described, it will be understood that numerous details of the construction shown may be altered or omitted without departing from the spirit of this invention, as defined by the following claims.

I claim:—

1. A device of the class described, comprising a bolt provided with an angular shoulder adjacent one end thereof, a cup-shaped shell having an integral base provided with an angular aperture registering with the said angular shoulder and having its side split to form a plurality of tongues disposed at an angle to the bolt.

2. The combination of a bolt having a shank and a flanged head and provided with a shoulder adjacent to the head, and a cup-shaped shell having an integral base provided with an aperture adapted to receive said shank and shaped to provide an interior perimeter adapted to coact with the shoulder on said shank for preventing relative rotation of said shell and shank, and means movable along said shank for expanding said shell to secure the bolt.

3. The combination of a bolt comprising a threaded shank and a head at one end, and a plurality of cup-shaped holding members, each comprising an integral apertured base and a plurality of conically diverging tongues, said members being adapted to be slid upon said bolt and nested one within the other, a sleeve mounted on said shank outward of said members and having a wedge-shaped end, all being arranged to cause the simultaneous expansion of said nested members when said sleeve is forced toward said head.

4. An expansion bolt, comprising a threaded shank, a plurality of expansion members nested one within the other and mounted thereon and having a plurality of movable lugs, the lugs on one of said expansion members being arranged to break joint with those of the adjacent members, and means movable along said shank for urging said lugs transversely outward from said shank.

5. An expansion bolt comprising a shank, a plurality of expansion shells, each having a plurality of lugs thereon, said expansion shells being adapted to be placed on said shank and nested one within another, and an expanding member movable along said shank for engaging said lugs and urging them transversely outward from said shank.

6. An expansion bolt, comprising a threaded shank having a flanged head, an expansion member mounted thereon and having an integral base and a plurality of movable lugs, means movable along said shank for urging said lugs transversely outward from said shank, and a shoulder on said shank, said expansion member having an angular aperture therein adapted to engage with said shoulder for securing said shank and member against relative turning.

Signed at Chicago this 8th day of April 1911.

MATHEW H. PAINE.

Witnesses:
GEO. W. CARR,
MARY M. DILLMAN.